Feb. 3, 1925.

A. T. KASLEY 1,524,656

STOKER CONTROL

Filed Jan. 24, 1921

A. T. Kasley
INVENTOR

BY D. C. Davis
ATTORNEY

Patented Feb. 3, 1925.

1,524,656

UNITED STATES PATENT OFFICE.

ALEXANDER T. KASLEY, OF ESSINGTON, PENNSYLVANIA, ASSIGNOR TO WESTINGHOUSE ELECTRIC AND MANUFACTURING COMPANY, A CORPORATION OF PENNSYLVANIA.

STOKER CONTROL.

Application filed January 24, 1921. Serial No. 439,615.

*To all whom it may concern:*

Be it known that I, ALEXANDER T. KASLEY, a citizen of the United States, and a resident of Essington, in the county of Delaware and State of Pennsylvania, have invented a new and useful Improvement in Stoker Controls, of which the following is a specification.

My invention relates to mechanical stokers and more particularly to governing means for the fuel-feeding mechanism thereof, and it has for its object the provision of means whereby the rate at which fuel is delivered to a furnace is directly controlled by the rate of air supply to the furnace.

Figure 1:
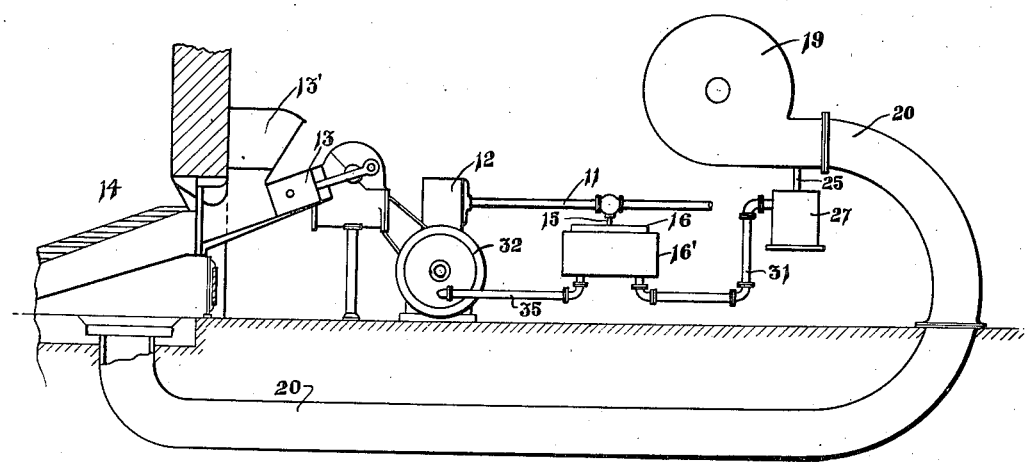
Figure 2:
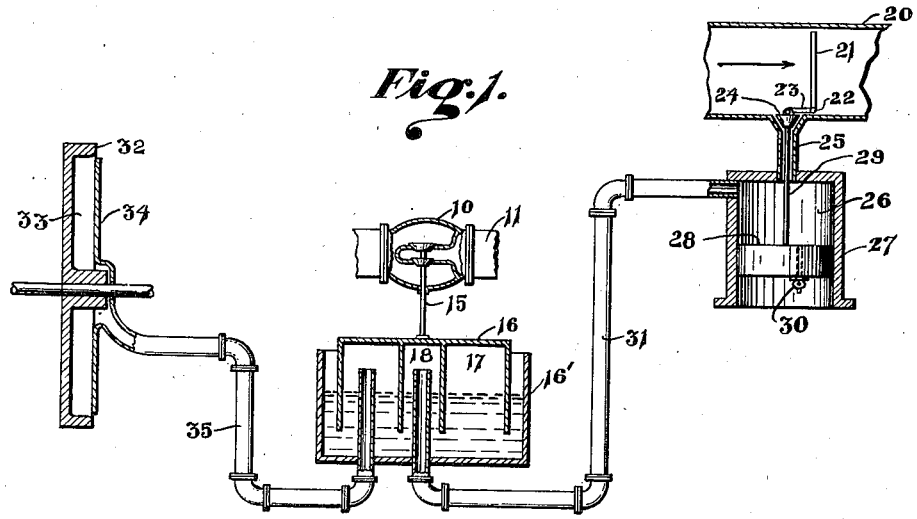

I attain this object by means of the mechanism shown in the accompanying drawing in which Fig. 1 is a diagrammatic view of a stoker installation embodying my invention, and Fig. 2 is a diagrammatic view, partially in section, of a portion of the apparatus shown in Fig. 1.

In order to obtain the greatest amount of heat energy from fuel consumed in a furnace, a proper combination of fuel and air must be had at all times. Heretofore, attempts to regulate the fuel fed into the furnace have largely been made dependable upon the pressure existing in the supply air duct. A regulation which depends upon air pressure in the air supply is not dependable under all conditions of operation, due to the fact that pressure built up within the air duct is not necessarily proportional to the amount of air required for complete combustion. This is more apparent from a consideration of the conditions prevailing in the furnace where fuel of different degrees of fineness or fuel having differing ash content is fed into the furnace. Coarse fuel offers less resistance to the passage of air through the fuel bed than fine fuel and consequently throttles or builds up a lesser pressure in the air supply pipe. The pressure of air is not under these conditions a measure of the amount required for complete combustion. The velocity of the air passing through the duct where a greater or less resistance is offered to air passage through the fuel body, is always proportioned to the amount of air supplied to the furnace. By proper co-ordination of the rate of fuel feed and the velocity of the air within the duct, air and fuel may be supplied to the furnace in proper proportions to secure complete combustion with varying grades of fuel. Again, a fuel with high ash content may form a clinker mat on the grate which retards the entrance of air to the furnace and a pressure builds up and the stoker engine or other driving apparatus regulated by air pressure, will feed in an increased amount of fuel to the combustion chamber which is not consumed but is passed on and discharged into the ash pit.

In an apparatus constructed in accordance with my invention, I make the regulation of the fuel fed to the furnace directly responsive to the velocity of air passing to the fuel bed. By such an arrangement it is readily apparent that the proper relation of fuel and air is had at all times, as for example, if the fuel bed burns thin, air will pass through more readily and the increased flow of air will stimulate the stoker feed and additional fuel will be supplied to the fuel bed. A heavy fuel bed does not allow air to pass through with so high a velocity but tends to build a pressure and hasten combustion.

I may further provide an air regulator operated by the speed of the stoker drive mechanism to prevent excessive feeding of fuel due to the fluctuations in the velocity of air to the furnace which may be caused for reasons heretofore stated.

Referring to the drawings for a more detailed understanding of my invention, I indicate a throttling valve 10 located in a steam line 11 which supplies steam to a stoker engine 12. The stoker engine 12 through suitable reduction mechanism drives a fuel ram 13 which operates to force fuel from a hopper 13' into a furnace 14 in the usual manner. The valve 10 is provided with a suitable control means which is responsive to the velocity of the air feed to the furnace and to the rate of feed of fuel into the furnace. As shown, this control means comprises a gasometer bell 16 connected by a link 15 to the valve 10. The interior of the bell 16 comprises two concentric compartments 17 and 18. The lower edges of the compartments 17 and 18 are immersed in a suitable liquid container 16', the liquid in which forms a seal between the two compartments. Air is supplied by a fan 19, driven in any suitable manner, to force the air through a conduit 20 which connects with the furnace 14. Located in the air duct 20 which supplies air under pressure to the furnace 14 is a vertical vane 21 pivoted at 22 and operatively connected by means of a lever 23 to a valve 24. The valve 24 serves to regulate the flow of air through a conduit 25 which leads from the air duct 20 to an air-operated relay mechanism. The relay mechanism comprises a chamber 26 formed within a cylinder 27 and a piston 28 arranged to reciprocate within the cylinder 27, the piston being directly connected to the valve 24 by means of a rod 29, and therefore the vane 21 may impart motion to the piston 28 as well as vary the effectiveness of the valve 24. The lower end of the cylinder 27 is open, as shown, so that the bottom of the piston 28 is always subjected to the pressure of the atmosphere. Located in the piston is a leak valve 30 adapted to allow the escape of air in predetermined quantities. A conduit 31 communicates between the chamber 26 and the compartment 18 of the gasometer bell so that variations in pressure in the chamber 26 are transmitted to the gasometer bell which is connected to the valve 10 controlling the stoker driving mechanism 12.

Mounted on the stoker driving mechanism 12 is a fly wheel 32 with spokes 33 formed therein similar to blades of a fan. A plate 34 in conjunction with the web of the wheel forms a pump chamber. A region of low pressure is produced by the rotation of the spokes and I place one end of a conduit 35 in this region of low pressure. The other end of the conduit 35 connects with the compartment 17 of the gasometer bell 16. I accomplish a more uniform regulation than would otherwise be feasible by having the pressure in the compartment 17, which is varied by the speed of the stoker drive mechanism, and the pressure in compartment 18, which is varied by the velocity of air flowing through conduit 20, counteract each other to regulate the amount of opening and closing of the throttling vlave 10.

Having thus described the arrangement of apparatus constructed in accordance with my invention, the operation thereof is as follows: Under normal conditions of operation, the fan 19 delivers the air blast to the furnace 14 through the air duct 20, steam being supplied to the stoker engine through the conduit 11. The vane 21 pivoted in the duct 20 is subjected to a pressure substantially proportional to the square of the velocity of air passing therethrough. If the pressure on the piston 28 does not balance the pressure on the vane 21 it will move one way or the other until the valve 24 is in such a position that this balance is secured. It will be seen then that the pressure in the chamber 26 is substantially proportional to the square of the air velocity. Under certain conditions of operation, the fuel bed may burn thin and the air flowing through the conduit 20 has a greater velocity. This increase in velocity causes a greater deflection of the vane 21 and opens the port 24 which permits an increased amount of air to pass to the chamber 26 where an increased pressure is built up. This increase in pressure is communicated to the compartment 18 through the conduit 31 and raises the gasometer bell which acts upon the balanced valve 10 through the link 15 to admit more steam to the stoker engine 12. When a greater resistance to the passage of air through the fuel bed is offered, due to any cause, the velocity of the air through the duct 20 is decreased. A lesser deflection of the vane 21 and a partial closing of the valve 24 results, so that decreased amounts of air are passed to the chamber 26. The flow of air through the leak valve 30 being now greater than the flow of air into the chamber 26 through valve 24, the pressure in chamber 26 and communicating chambers 18 diminishes, resulting in a fall of the gasometer bell 16 and a throttling of the steam passing through the valve 10. The valve 10 will open or close until the speed of the engine becomes such that the low pressure existing adjacent the engine fly wheel acting on its part of the gasometer bell 17 balances the pressure in the chamber 26 and acting in the chamber 18. As the pressure in a centrifugal pump is substantially proportional to the square of the speed it will be seen that the speed of the engine will be substantially proportional to the velocity of the air supply.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. The method of regulating combustion in an automatic stoker furnace, which comprises feeding solid fuel to maintain a progressively moving fuel bed in the furnace, supplying air at a super-atmospheric pressure to the furnace beneath the fuel bed, and controlling the rate of fuel feed by and in accordance with the velocity of the air delivered to the furnace.

2. In a stoker furnace into which solid fuel is mechanically fed to form a progressively moving fuel bed, mechanical means for supplying air at a super-atmospheric pressure to the furnace beneath the fuel bed, mechanical means for feeding fuel to the furnace, and means utilizing a regulating effect derivable from the velocity of air supply to the furnace for controlling the rate of fuel fed to the furnace.

3. In combination with a furnace, a fuel feed mechanism, a conduit to supply air to the furnace, a deflector vane located in the air conduit and means responsive to the speed of the fuel feed mechanism and to various pressures on the deflector vane to regulate the rate of fuel fed to the furnace.

4. In combination in a combustion chamber, means for feeding fuel into the chamber, means for supplying air at a super-atmospheric pressure to said chamber, an air operated relay mechanism responsive to the rate of fuel feed and to the rate of air supply, and means for associating the relay mechanism with the fuel feeding means for controlling rate of fuel feed.

5. In combination with a furnace provided with fuel-feeding means and with air supplying means, of control means operable for the adjustment of the rate of fuel supply, means for deriving a controlling force which is a function of the rate of air supply to said furnace, additional means for deriving a controlling force which is a function of the rate of fuel supply, and means for combining said forces differentially for application to said control means.

6. In combination with a furnace provided with fuel feeding means and with air-supplying means, of control means operable for the adjustment of the rate of fuel supply, means for deriving a controlling force which is substantially proportional to the square of the rate of air supply to said furnace, additional means for deriving a controlling force which is substantially proportional to the square of the rate of fuel supply, and means for combining said forces differentially for application to said control means.

7. In combination with a furnace fuel feeding mechanism having an air supply duct and an engine for driving a stoker, of a gasometer bell arranged to control the supply of steam to the stoker engine, said gasometer bell having two separated chambers, a vane pivotally mounted in the air supply duct, a valve in the air supply duct operated by the swinging of the vane, a conduit leading from said valve to one of the chambers of said gasometer bell, a fly wheel for the engine, a casing about one side of the wheel cooperating with the wheel to form a vacuum pump, a conduit leading from the casing to the other chamber of the gasometer bell, the arrangement being such that an increase of velocity of air through said duct will raise, and an increase of velocity of the engine will lower said gasometer bell, whereby a differential control of the stoker engine dependent upon the rate of flow of the air to the furnace and the speed of the stoker engine may be obtained.

8. In combination with a furnace provided with air supplying means and with fuel feeding means having a motive fluid supply, of control means for the motive fluid supply comprising a vane in the air supply means arranged to assume different positions under different rates of air supply, a valve in the air supply means operated by movements of the vane, a conduit connecting said valve to said control means, a fly-wheel associated with the fuel feeding means, means for utilizing the rotation of the fly-wheel to produce a pumping action, a conduit connecting said pumping means to said control means, whereby a differential control of the fuel feeding means dependent upon the air supply means and the speed of the fuel feeding means may be obtained.

9. In combination with a furnace provided with an air supplying means and with fuel feeding means having a motive fluid supply, of control means for the motive fluid supply comprising a gasometer bell arranged to control the supply of motive fluid to the fuel feeding means, a means in the air supply conduit arranged to permit varying amounts of air to escape under different rates of air supply, a conduit connecting said means to said gasometer bell, a fly-wheel associated with the fuel feeding means, means for utilizing the rotation of the fly-wheel to produce a pumping action, a conduit connecting said pumping means to said gasometer bell, whereby a differential control of the fuel feeding means dependent upon the air supply means conduit and the speed of the fuel feeding means may be obtained.

In testimony whereof, I have hereunto subscribed my name this 20th day of January, 1921.

ALEXANDER T. KASLEY.